United States Patent
Jakobsson et al.

(12)

(10) Patent No.: US 11,115,088 B2
(45) Date of Patent: Sep. 7, 2021

(54) ANTENNA ARRAY OPERATION CONTROL

(71) Applicant: Telefonaktiebolaget LM Ericsson (publ), Stockholm (SE)

(72) Inventors: Peter Jakobsson, Lund (SE); Martin Isberg, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/980,767

(22) PCT Filed: Mar. 16, 2018

(86) PCT No.: PCT/EP2018/056753
§ 371 (c)(1),
(2) Date: Sep. 14, 2020

(87) PCT Pub. No.: WO2019/174753
PCT Pub. Date: Sep. 19, 2019

(65) Prior Publication Data
US 2020/0412420 A1    Dec. 31, 2020

(51) Int. Cl.
*H04B 7/04* (2017.01)
*H04B 7/0452* (2017.01)
(Continued)

(52) U.S. Cl.
CPC ......... *H04B 7/0452* (2013.01); *H04L 5/0037* (2013.01); *H04W 16/28* (2013.01); *H04W 72/044* (2013.01); *H04W 72/0486* (2013.01)

(58) Field of Classification Search
CPC .. H04B 7/0413; H04B 7/0452; H04B 7/0491; H04B 7/0691; H04W 16/02;
(Continued)

(56) References Cited

U.S. PATENT DOCUMENTS

2010/0166098 A1\* 7/2010 Luz .................. H04B 7/0413
375/267
2013/0225216 A1    8/2013 Calin et al.
(Continued)

FOREIGN PATENT DOCUMENTS

EP    2469721 A1    6/2012

OTHER PUBLICATIONS

International Search Report dated Nov. 19, 2018 for International Application No. PCT/EP2018/056753 filed on Mar. 16, 2018, consisting of 16-pages.

*Primary Examiner* — Siu M Lee
(74) *Attorney, Agent, or Firm* — Christopher & Weisberg, P.A.

(57) ABSTRACT

A method is disclosed for controlling operations of an antenna array comprising two or more controllable sections and antenna ports connected to transceiver circuitry. The method includes determining a scenario of transmission or reception by the antenna array, and configuring the transceiver circuitry responsive to the determined scenario. The scenario is defined in terms of a requirement for a number of users intended as receivers or transmitters, respectively, of the transmission or reception and in terms of one or more of: a path loss requirement, a peak rate requirement, and a traffic capacity requirement. The configuration includes, for the transmission or reception, one or more of: allocating a number of sections of the two or more sections of the antenna array and determining a sub-division of the allocated sections, determining a number of information data layers for multiple-input multiple-output application, and allocating a bandwidth.

12 Claims, 4 Drawing Sheets

(51) Int. Cl.
*H04L 5/00* (2006.01)
*H04W 16/28* (2009.01)
*H04W 72/04* (2009.01)

(58) Field of Classification Search
CPC ..... H04W 16/04; H04W 16/06; H04W 16/08; H04W 16/10; H04W 16/12; H04W 16/14; H04W 16/28; H04W 72/04; H04W 72/0413; H04W 72/042; H04W 72/044; H04W 72/0453; H04W 72/0486; H04W 72/08; H04W 72/087; H01Q 3/26; H01Q 21/061; H04L 5/0037
See application file for complete search history.

(56) References Cited

U.S. PATENT DOCUMENTS

| | | | |
|---|---|---|---|
| 2016/0066318 A1* | 3/2016 | Pereira | H04W 74/06 370/329 |
| 2016/0094286 A1 | 3/2016 | Maltsev et al. | |
| 2016/0165457 A1 | 6/2016 | Inoue et al. | |
| 2016/0330135 A1* | 11/2016 | Xia | H04L 67/32 |
| 2018/0062712 A1* | 3/2018 | Hogberg | H04B 7/0452 |

* cited by examiner

ANTENNA ARRAY OPERATION CONTROL

CROSS-REFERENCE TO RELATED APPLICATIONS

This application is a Submission Under 35 U.S.C. § 371 for U.S. National Stage Patent Application of International Application Number: PCT/EP2018/056753, filed Mar. 16, 2018 entitled "ANTENNA ARRAY OPERATION CONTROL," the entirety of which is incorporated herein by reference.

TECHNICAL FIELD

The present disclosure relates generally to the field of wireless communication. More particularly, it relates to control the operation of an active antenna array (advanced antenna system, AAS) for wireless communication.

BACKGROUND

One technique to improve the system performance in wireless communication is to use an advanced antenna system (AAS). This technique is considered, for example, in relation to standardization and implementation of fifth generation (5G) of cellular communication systems. Properly controlled advanced antenna arrays enable beamforming for transmission and/or reception, which can be used to increase capacity and/or coverage for a cellular communication system.

An array of antennas, or antenna array, may be controlled by controlling the phase of a signal at the different antenna elements of the antenna array. Alternatively, an antenna array may be controlled by controlling a time delay at the different antenna elements of the antenna array. Yet alternatively, an antenna array may be controlled by controlling the phase and amplitude of a signal at the different antenna elements of the antenna array.

Several different techniques exist to control the relative phase (or time delay) between radio frequency (RF) signals of the array. Examples of such techniques include analog beamforming, digital beamforming and hybrid beamforming; all of which are well known in the art. In analog beamforming, phase shift (or time delay) is typically applied to the RF-signal or to the local oscillator (LO) signal that is used for up/down conversion of the transmission/reception signal. In digital beamforming, phase shift (or time delay) is typically implemented digitally, e.g., by digitally phase shifting an orthogonal frequency division multiplexing (OFDM) modulated signal in time or frequency domain. Hybrid beamforming is a mixture of analog and digital beamforming.

In analog beamforming, the complete antenna array is typically phase controlled so that it has its maximum antenna gain in one specific direction. This entails that the complete supported bandwidth can only be given to one user; or to a limited number of users in same geographical area (direction) covered by the resulting beam.

The 5G cellular communication system is planned to be deployed on new frequency bands as well as on existing frequency bands. Typically, the bandwidth (B W of each defined operating frequency band may relate to (e.g. in a scaling manner) the carrier frequency. Bandwidths in the order of several GHz may exist (and may even be common) for frequency bands in the frequency range of 24-53 GHz (millimeter, mm, wave frequencies).

The efficiency of a power amplifier (PA) may be improved by linearization using digital pre-distortion approaches. Typically, efficient linearization requires a linearization signal bandwidth which is at least three times the bandwidth of the actual signal. For an AAS radio operating in millimeter wave frequencies with a signal bandwidth of 800 MHz, a linearization signal bandwidth of 3×800 MHz=2.4 GHz may be required to perform proper digital pre-distortion. Thus, for closed loop linearization, the feedback path and the transmitter path need to support at least 2.4 GHz bandwidth, which may be cumbersome or even impossible under power efficiency constraints.

Therefore, there is a need for alternative (and possibly improved) approaches to control of antenna arrays. Preferably, such alternative approaches provide increased flexibility. Also preferably, such alternative approaches provide for less demanding bandwidth requirements in relation to pre-distortion.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is to be noted that when it is referred herein to control of an antenna array, controlling operations of an antenna array, or similar, typical embodiments achieve this control by controlling the radio circuitry connected to the antenna.

It is an object of some embodiments to solve or mitigate, alleviate, or eliminate at least some of the above or other disadvantages.

According to a first aspect, this is achieved by a method for controlling operations of an antenna array comprising two or more controllable sections and antenna ports connected to transceiver circuitry.

The method comprises determining a scenario of transmission or reception by the antenna array. The scenario is defined in terms of a requirement for a number of users intended as receivers or transmitters, respectively, of the transmission or reception and in terms of one or more of: a path loss requirement, a peak rate requirement, and a traffic capacity requirement.

The method also comprises configuring the transceiver circuitry responsive to the determined scenario. The configuration comprises, for the transmission or reception, one or more of: allocating a number of sections of the two or more sections of the antenna array and determining a sub-division of the allocated sections, determining a number of information data layers for multiple-input multiple-output (MIMO) application, and allocating a bandwidth.

In some embodiments, the configuration comprises dynamically configuring the transceiver circuitry responsive to the determined scenario.

In some embodiments, the transmission or reception may be an upcoming transmission or reception.

In some embodiments, the method further comprises performing the transmission or reception by transmitting to, or receiving from, the users in accordance with the configuration.

In some embodiments, determining the scenario comprises selecting one of a plurality of predefined scenarios. The plurality of predefined scenarios may comprise one or more of: a high path loss scenario, a high traffic capacity scenario, and a high peak rate scenario.

Configuring the transceiver circuitry responsive to the high path loss scenario may comprise (for each user) allocating a relatively high number of sections and determining that the allocated sections are sub-divided into a single group, determining a relatively low number of information data layers, and allocating a relatively low bandwidth.

Configuring the transceiver circuitry responsive to the high traffic capacity scenario may comprise (for each user) allocating a relatively low number of sections and determining that the allocated sections are sub-divided into a single group, and determining a relatively high number of information data layers.

Configuring the transceiver circuitry responsive to the high peak rate scenario may comprise (for each user) allocating a relatively high number of sections and determining that the allocated sections are sub-divided into a plurality of groups, determining a relatively low number of information data layers, and allocating a relatively high bandwidth.

In some embodiments, the high path loss scenario is further defined by a relatively low number of users. In some embodiments, the high traffic capacity scenario is further defined by a relatively high number of users. In some embodiments, the high peak rate scenario is further defined by a relatively low number of users.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an arrangement for controlling operations of an antenna array comprising two or more controllable sections and antenna ports connectable to transceiver circuitry. The arrangement comprises controlling circuitry configured to cause determination of a scenario of transmission or reception by the antenna array and configuration of the transceiver circuitry responsive to the determined scenario.

The scenario is defined in terms of a requirement for a number of users intended as receivers or transmitters, respectively, of the transmission or reception and in terms of one or more of: a path loss requirement, a peak rate requirement, and a traffic capacity requirement.

The configuration comprises, for the transmission or reception, one or more of: allocation of a number of sections of the two or more sections of the antenna array and determination of a sub-division of the allocated sections, determination of a number of information data layers for multiple-input multiple-output (MIMO) application, and allocation of a bandwidth.

In some embodiments, the controlling circuitry configured to cause the configuration by causing dynamic configuration of the transceiver circuitry responsive to the determined scenario.

In some embodiments, the transmission or reception may be an upcoming transmission or reception.

In some embodiments, the arrangement further comprises a multiplexer, controlled by the controlling circuitry and configured to distribute an incoming information stream for each user into a number of streams corresponding to the allocated number of sections, the sub-division of the allocated sections, and the determined number of information data layers.

In some embodiments, the arrangement further comprises the transceiver circuitry and/or the antenna array.

A fourth aspect is a wireless communication device comprising the arrangement of the third aspect.

A fifth aspect is a network node comprising the arrangement of the third aspect.

In some embodiments, any of the above aspects may additionally have features identical with or corresponding to any of the various features as explained above for any of the other aspects.

An advantage of some embodiments is that alternative approaches to control of antenna arrays are provided.

Another advantage of some embodiments is that the flexibility of antenna array control is increased.

For example, the increased flexibility may enable (dynamic) trade-off between cell size and cell capacity.

For example, the increased flexibility may support non-contiguous spectrum utilization by division of the antenna array into sections operating in different spectrum parts.

For example, the increased flexibility may enable (or facilitate) use of digital pre-distortion, since proper handling of bandwidth requirements is provided. Implementation of digital pre-distortion is enabled due to the possibility to limit the bandwidth of the transmitted signal.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, the complete antenna array is typically phase controlled so that it has its maximum antenna gain in one specific direction in analog beamforming. A more flexible solution includes splitting the antenna array panel into strictly separated, smaller antenna arrays that operate at different frequencies. The number of such smaller antenna arrays may be any suitable number, e.g. two or four. With such a solution, it is possible to simultaneously serve a corresponding number of different users with a 2×2 multiple-input multiple-output (MIMO). However, the splitting of the antenna array panel will result in reduced antenna gain for each of the smaller antenna arrays, thereby resulting in degradation of equivalent isotropic radiated power (EIRP) and equivalent isotropic sensitivity (EIS) compared to a scenario where the entire antenna array panel is used as one single antenna array. Typically, the degradation is 3 dB for every halving of the antenna array size, i.e., 3 dB degradation for two antenna arrays, 6 dB degradation for four antenna arrays, etc.

In the following, embodiments will be described providing control of operations of an antenna array comprising two or more controllable sections and antenna ports connected to transceiver circuitry.

Figure 1:
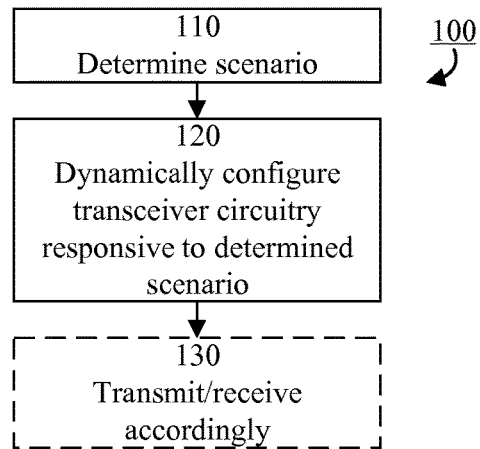
FIG. 1 is a flowchart illustrating example method steps according to some embodiments.

FIG. 1 illustrates an example method 100 according to some embodiments. In step 110, a scenario of transmission or reception by the antenna array is determined and in step 120, the transceiver circuitry is configured responsive to the determined scenario. In optional step 130, the transmission or reception is performed by transmitting to, or receiving from, the users in accordance with the configuration of step 120.

The scenario determined in step 110 is defined in terms of a requirement for a number of users intended as receivers or transmitters, respectively, of the transmission or reception. Furthermore, the scenario is defined in terms of one or more of: a path loss requirement, a peak rate requirement, and a traffic capacity requirement.

Typically, determining the scenario in step 110 may comprise selecting one of a plurality of predefined scenarios; typically selecting the predefined scenario of the plurality that most resembles the actual scenario of the transmission or reception, according to some suitable comparison. As will be elaborated on further herein such a plurality of predefined scenarios may comprise one or more of: a high path loss scenario (a first scenario), a high traffic capacity scenario (a second scenario), and a high peak rate scenario (a third scenario).

Generally, it is to be understood that, when terms such as "high", "low", etc. are used herein to define a scenario, such relative terms should be interpreted in comparison with other scenarios, e.g., they may be defined relative to an average over the plurality of predefined scenarios. To exemplify, the high path loss scenario may be defined as a scenario having a path loss that is higher than an average path loss of the plurality of predefined scenarios. Similarly, the high traffic capacity scenario may be defined as a scenario requiring a traffic capacity that is higher than an average required traffic capacity of the plurality of predefined scenarios. Also similarly, the high peak rate scenario may be defined as a scenario requiring a peak rate that is higher than an average required peak rate of the plurality of predefined scenarios.

As will be further exemplified herein, the configuration of step 120 comprises, for the transmission or reception (and typically for each of the users), one or more of:

allocating a number of sections of the two or more sections of the antenna array and determining a sub-division of the allocated sections, determining a number of information data layers for MIMO application, and allocating a bandwidth.

Figure 2:
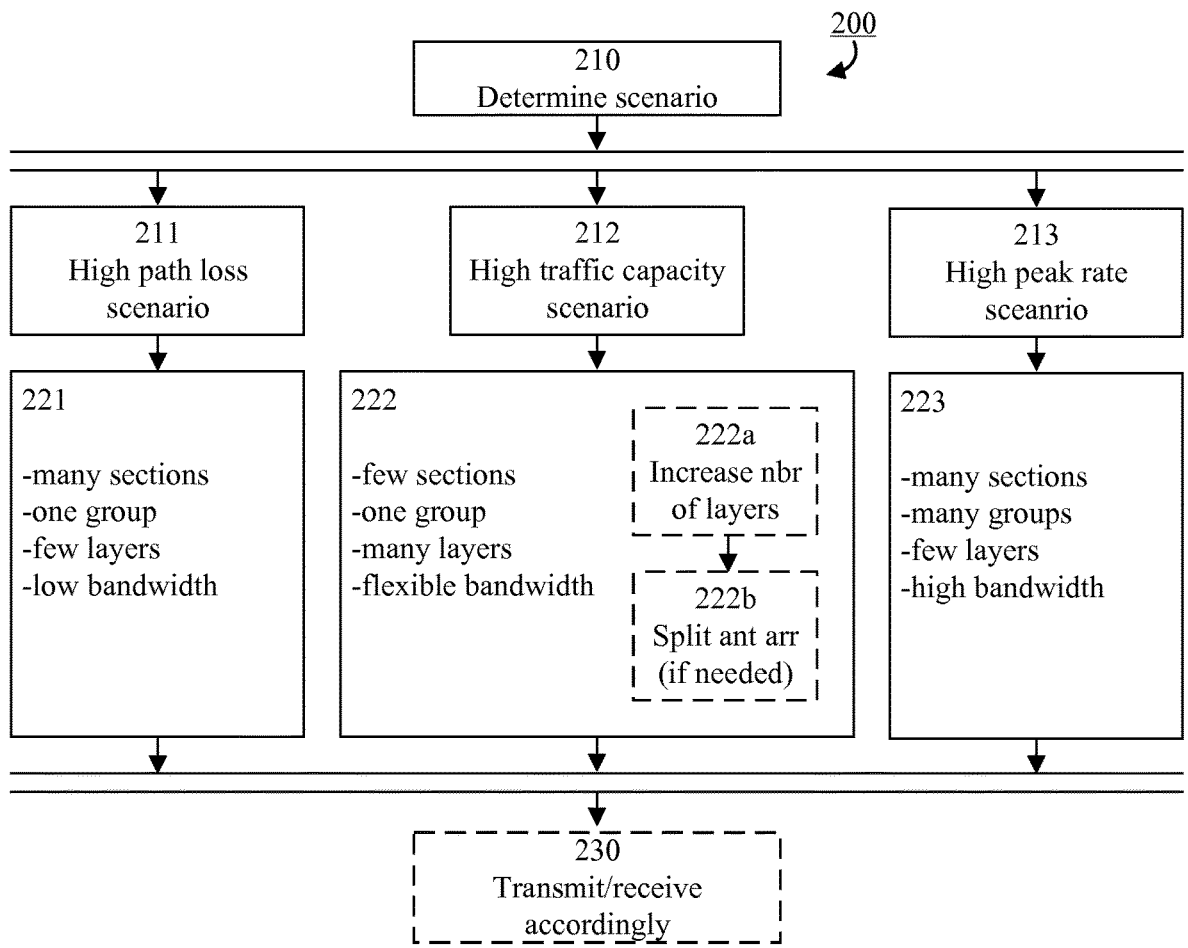
FIG. 2 is a flowchart illustrating example method steps according to some embodiments.

FIG. 2 illustrates an example method 200 according to some embodiments. The method 200 may be an example of a more specific version of the method 100 or FIG. 1.

In step 210 (compare with step 110 of FIG. 1), a scenario of transmission or reception by the antenna array is determined and in step 211, 221, 212, 222, 213, 223 (compare with step 120 of FIG. 1), the transceiver circuitry is configured responsive to the determined scenario. In optional step 230 (compare with step 130 of FIG. 1), the transmission or reception is performed by transmitting to, or receiving from, the users in accordance with the configuration.

The scenario determined in step 210 comprises selecting one of the following scenarios: a high path loss scenario (a first scenario; 211), a high traffic capacity scenario (a second scenario; 212), and a high peak rate scenario (a third scenario; 213).

The high path loss scenario (211) is defined as a scenario having a path loss that is higher than an average path loss of the plurality of predefined scenarios. Optionally the high path loss scenario may be further defined by a relatively low number of users; e.g., by having a number of users that is lower than an average number of users in the plurality of predefined scenarios. The relatively low number of users may be one or more than one.

For example, selection of the high path loss scenario may be responsive to path loss estimation performed based on received uplink signal power.

When the high path loss scenario has been selected, the configuration of the transceiver circuitry is performed according to step 221.

Allocation of a number of sections of the antenna array and determining a sub-division of the allocated sections may comprise allocating a relatively high number of sections for each user (e.g. a number of sections that is higher than an average number of sections allocated to a user in the plurality of predefined scenarios) and determining that the allocated sections are sub-divided into a single group. For example, when there is only one user, the entire antenna array may be allocated to the user.

Determination of a number of information data layers for MIMO application may comprise determining a relatively low number of information data layers for each user (e.g. a number of information data layers that is lower than an average number of information data layers determined for a user in the plurality of predefined scenarios). For example, a single information data layer may be used.

Allocating a bandwidth may comprise allocating a relatively low bandwidth (e.g. a bandwidth that is lower than an average bandwidth allocated for a user in the plurality of predefined scenarios).

The high traffic capacity scenario (212) is defined as a scenario requiring a traffic capacity that is higher than an average required traffic capacity of the plurality of predefined scenarios. Optionally the high traffic capacity scenario may be further defined by a relatively high number of users; e.g., by having a number of users that is higher than an average number of users in the plurality of predefined scenarios.

For example, selection of the high traffic load scenario may be responsive to a number of users to be served.

When the high traffic capacity scenario has been selected, the configuration of the transceiver circuitry is performed according to step 222.

Allocation of a number of sections of the antenna array and determining a sub-division of the allocated sections may comprise allocating a relatively low number of sections for each user (e.g. a number of sections that is lower than an average number of sections allocated to a user in the plurality of predefined scenarios) and determining that the allocated sections are sub-divided into a single group. For example, a single section may be allocated to the user.

Determination of a number of information data layers for MIMO application may comprise determining a relatively high number of information data layers for each user (e.g. a number of information data layers that is higher than an average number of information data layers determined for a user in the plurality of predefined scenarios). For example, a maximum number of information data layers may be used.

Allocating a bandwidth may comprise allocating any suitable bandwidth in this scenario, e.g., allocating either of a relatively low bandwidth (e.g. a bandwidth that is lower than an average bandwidth allocated for a user in the plurality of predefined scenarios), a relatively high bandwidth (e.g. a bandwidth that is higher than an average bandwidth allocated for a user in the plurality of predefined scenarios), and any bandwidth there between.

Typically in step 222, more layers are added first, using the full antenna array without dividing it into sections (multi-user MIMO; MU-MIMO) as illustrated by optional sub-step 222a. When all possible layers are used, sectioning of the antenna array may be applied if needed as illustrated by optional sub-step 222b, thereby increasing the overall bandwidth.

The high path peak rate scenario (213) is defined as a scenario requiring a peak rate that is higher than an average required peak rate of the plurality of predefined scenarios. Optionally the high peak rate scenario may be further defined by a relatively low number of users; e.g., by having a number of users that is lower than an average number of users in the plurality of predefined scenarios.

One example of a high peak rate scenario is self-backhaul. In such an example, the number of users may typically be one.

When the high peak rate scenario has been selected, the configuration of the transceiver circuitry is performed according to step 223.

Allocation of a number of sections of the antenna array and determining a sub-division of the allocated sections may comprise allocating a relatively high number of sections for each user (e.g. a number of sections that is higher than an average number of sections allocated to a user in the plurality of predefined scenarios) and determining that the allocated sections are sub-divided into a plurality of groups. For example, when there is only one user, the entire antenna array may be allocated to the user.

Determination of a number of information data layers for MIMO application may comprise determining a relatively low number of information data layers for each user (e.g. a number of information data layers that is lower than an average number of information data layers determined for a user in the plurality of predefined scenarios). For example, a single information data layer may be used.

Allocating a bandwidth may comprise allocating a relatively high bandwidth (e.g. a bandwidth that is higher than an average bandwidth allocated for a user in the plurality of predefined scenarios).

Of course, the scenarios in FIG. 2 are merely examples and other scenarios may be used in addition to, or instead of, one or more of the example scenarios of FIG. 2.

For example, one or more default scenarios may also be comprised in the plurality of scenarios; applicable when none of the high path loss scenario, the high traffic capacity scenario, and the high peak rate scenario is applicable.

When the method is performed by a wireless communications device, example pre-defined scenarios may include one or more of: a high path loss scenario (a fourth scenario; similar considerations as for 211), a carrier aggregation scenario (a fifth scenario; similar considerations as for 212), and a high peak rate scenario (a sixth scenario; similar considerations as for 213; e.g., used for short range file transfers).

Figure 3:
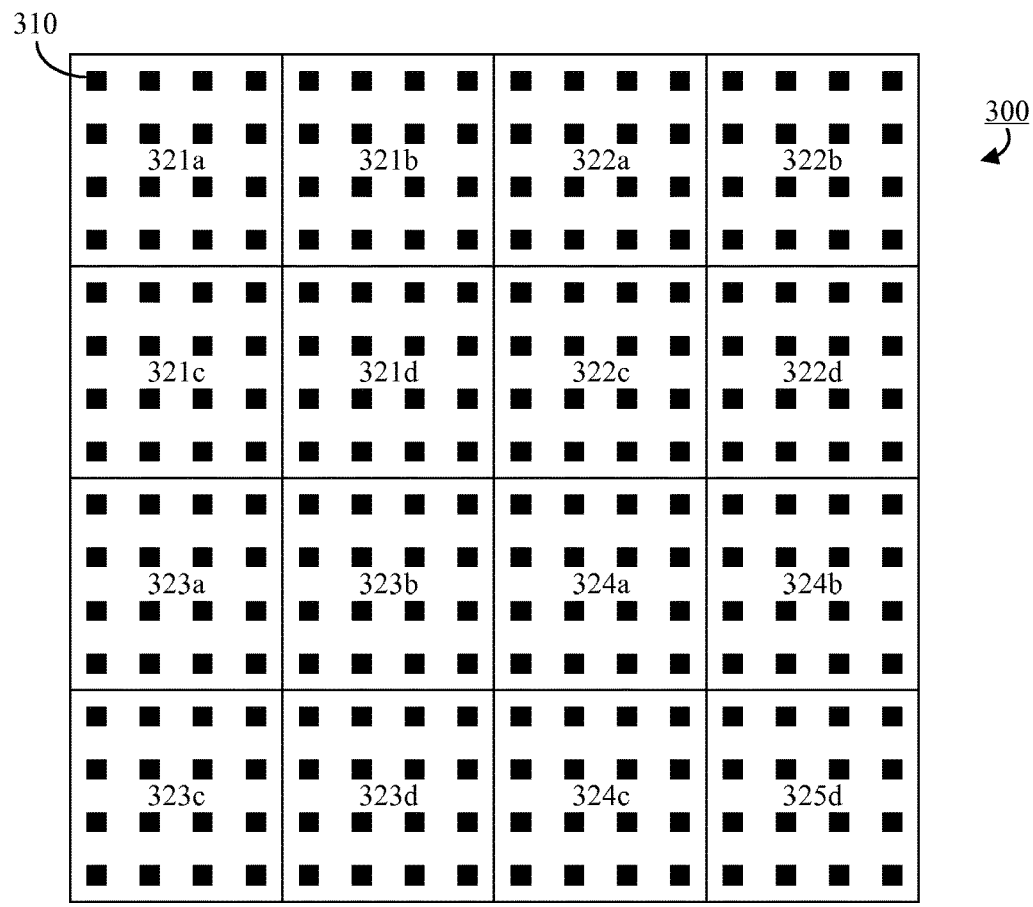
FIG. 3 is a schematic drawing illustrating an example antenna array and example scenarios according to some embodiments.
Figure 3:
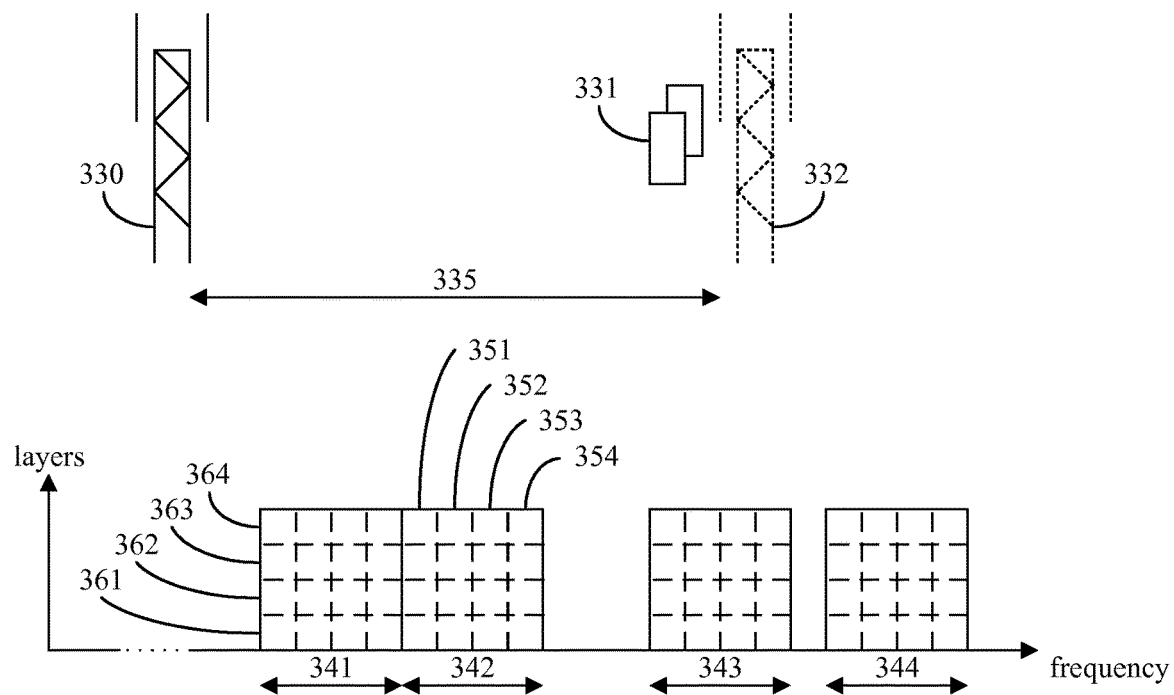

FIG. 3 schematically illustrates an example antenna array 300 according to some embodiments. The antenna array comprises two or more (in this case 16) controllable sections (321a-d, 322a-d, 323a-d, 324a-d) and antenna ports connectable to transceiver circuitry (not shown). Each section comprises a plurality of antenna elements 310. In this example, the entire antenna array has 16×16 antenna elements; each with dual polarized antennas (i.e. 512 antenna ports in total).

By controlling the centre frequency of the radio transceivers connected to each section, as well as which information layers are used, it is possible to (dynamically) reconfigure the same hardware to trade-off between one or more of: bandwidth, number of simultaneous users, signal reach, and EIRP/EIS.

It is to be noted that the sections of the antenna array do not comprise a splitting of the antenna array panel into strictly separated smaller antenna arrays as in the prior art. Rather the sections of the antenna array are (dynamically) controllable to work all of the sections together as a single antenna array, to work together in smaller groupings as a plurality of antenna arrays, or to work individually as a plurality of antenna arrays.

It should also be noted that the number of sections, the size of each section, and the shape of each section may be freely varied according to various embodiments, and are not limited to the example of FIG. 3. For example, each antenna port can, in principal, be regarded as a section of the antenna array.

FIG. 3 also schematically illustrates selection of example scenarios according to some embodiments. A network node 330 comprises the antenna array and a number of users are to be served in transmission/reception. In other embodiments, the antenna array may be comprised in a wireless communication device (e.g. a user equipment, UE). In any case, the users to be served may be one or more wireless communication devices 331 and/or a network node 332.

As mentioned above, the number of users 331, 332 to be served may be one condition for determining the scenario, e.g., selecting among a plurality of pre-defined scenarios. The path 335 between the network node 330 and the user(s) has an associated path loss, which may—additionally or alternatively—be one condition for determining the scenario, e.g., selecting among a plurality of pre-defined scenarios. The path loss may typically depend, at least partly, on a distance of the path 335 (but may—additionally or alternatively—depend on other parameters). In some situations, the high path loss scenario may therefore be seen as a long range scenario. Other possible causes to high path loss include building penetration loss, foliage loss, and outdoor to indoor penetration loss.

As also mentioned above, the required peak rate of one or more users 331, 332 to be served may be one condition for determining the scenario, e.g., selecting among a plurality of pre-defined scenarios. In the backhaul situation a high peak rate may be required and there is typically a line-of-sight (LOS) path between the network node 330 and the network node 332, the latter being the only user to be served.

The lower part of FIG. 3 schematically illustrates various bandwidths (horizontal axis) and information data layers for MIMO application (vertical axis). Four medium bandwidths are illustrated by 341, 342, 343, and 344 while four relatively low bandwidths are illustrated by 351, 352, 353, and 354. Four different information data layers are illustrated by 361, 362, 363, and 364.

Some example situations associated with different scenarios will now be described with reference to FIG. 3. The example situations focus on downlink but similar considerations may be equally applicable for the uplink.

The first, fourth, fifth and sixth example situations may illustrate typical situations for a default scenario, the high traffic capacity scenario, the high path loss scenario and the high peak rate scenario, respectively, according to some embodiments.

In a first example situation, a single user 331 is to be served and the estimated path loss has a medium value (neither particularly high nor particularly low). In such a situation, the configuration may comprise using the entire antenna array 300 as a single array (allocating all sections to the user and determining that the sections are sub-divided into a single group). Two information data layers (e.g., 361 combined with 362 and 363 combined with 364) may be used servicing the user by 2×2-MIMO. A medium radio frequency bandwidth (e.g. 341) of, e.g., 400 MHz may be used, resulting in a data bandwidth of 800 MHz (the data bandwidth generally being equal to the radio frequency bandwidth multiplied by the number of information data layers). This example situation may correspond to a default scenario.

In a second example situation, two users 331 are to be served and the estimated path loss has a medium value. In such a situation, the configuration may comprise using the entire antenna array 300 as a single array (allocating all sections to the users and determining that the sections are sub-divided into a single group). Four information data layers (e.g., 361, 362, 363, 364) may be used servicing each of the users by 2×2-MIMO. A medium radio frequency bandwidth (e.g. 341) of, e.g., 400 MHz may be used (the same as the radio frequency bandwidth of the first example situation), resulting in a data bandwidth of 1600 MHz (200% of the data bandwidth of the first example situation). The power spectral density (PSD) may be 3 dB lower than in the first example situation (per layer or per user) and the EIRP may the same as in the first example situation. This example situation may correspond to a default scenario.

In a third example situation, eight users 331 are to be served and the estimated path loss has a low value. In such a situation, the configuration may comprise splitting the antenna array 300 into four parts (e.g., one part consists of sections 321a-d, one part consists of sections 322a-d, etc.), allocating each part to two of the users (a pair of users) and determining that the sections of each part are sub-divided into a single group. Four information data layers (e.g., 361, 362, 363, 364) may be used servicing each of the users by 2×2-MIMO. A low bandwidth (e.g. 351, 352, 352, 354) of, e.g., 100 MHz may be used for each pair of users, resulting in a data bandwidth of 1600 MHz (200% of the data bandwidth of the first example situation) and a radio frequency bandwidth of 400 MHz (the same as the radio frequency bandwidth of the first example situation). The power spectral density (PSD) may be 9 dB lower than in the first example situation (per layer or per user) and the EIRP may be 6 dB lower than in the first example situation. This example situation may correspond to a high traffic capacity (HTC) scenario.

In a fourth example situation, eight users 331 are to be served and the estimated path loss has a low value. In such a situation, the configuration may comprise splitting the antenna array 300 into four parts (e.g., one part consists of sections 321a-d, one part consists of sections 322a-d, etc.), allocating each part to two of the users (a pair of users) and determining that the sections of each part are sub-divided into a single group. Four information data layers (e.g., 361, 362, 363, 364) may be used servicing each of the users by 2×2-MIMO. A medium bandwidth (e.g. 341, 342, 342, 344) of, e.g., 400 MHz may be used for each pair of users, resulting in a data bandwidth of 6400 MHz (800% of the data bandwidth of the first example situation) and a radio frequency bandwidth of 1600 MHz (400% of the radio frequency bandwidth of the first example situation). The power spectral density (PSD) may be 15 dB lower than in the first example situation (per layer or per user) and the EIRP may be 6 dB lower than in the first example situation. This example situation may also correspond to a high traffic capacity (HTC) scenario.

In a fifth example situation, a single user 331 is to be served and the estimated path loss has a high value. For example, the user may be on the edge of the cell and would preferably be scheduled with high EIRP. In such a situation, the configuration may comprise using the entire antenna array 300 as a single array (allocating all sections to the user and determining that the sections are sub-divided into a single group). Two information data layers (e.g., 361 combined with 362 and 363 combined with 364) may be used servicing the user by 2×2-MIMO. A low radio frequency bandwidth (e.g. half of 351) of, e.g., 50 MHz may be used (12.5% of the radio frequency bandwidth of the first example situation), resulting in a data bandwidth of 100 MHz (12.5% of the data bandwidth of the first example situation). The power spectral density (PSD) may be 9 dB higher than in the first example situation (per layer or per user) and the EIRP may be the same as in the first example situation. This example situation may correspond to a high path loss (HPL) scenario.

In a sixth example situation, a single user 332 is to be served in a self-backhaul application with a line-of-sight (LOS) communication path. In such a situation, it may only be possible to use up to two information data layers. It may be beneficial to configure the antenna array to support a high bandwidth and low EIRP/EIS to increase throughput on a single link. In such a situation, the configuration may comprise allocating the entire antenna array to the user and sub-dividing the antenna array into four groups (e.g., one group consists of sections 321a-d, one group consists of sections 322a-d, etc.) operating at different frequencies. Two information data layers (e.g., 361 combined with 362 and 363 combined with 364) may be used servicing the user by 2×2-MIMO. A medium bandwidth (e.g. 341, 342, 343, 344) of, e.g., 400 MHz may be used for each group of sections resulting in a high total bandwidth, e.g., a data bandwidth of 3200 MHz (400% of the data bandwidth of the first example situation) and a radio frequency bandwidth of 1600 MHz (400% of the radio frequency bandwidth of the first example situation). The power spectral density (PSD) may be 12 dB lower than in the first example situation (per layer or per user) and the EIRP may be 6 dB lower than in the first example situation. This example situation may correspond to a high peak rate (HPR) scenario.

The following table summarizes the first to sixth examples, where #sec denotes the number of allocated sections for a user, #gr denotes the number of groups of sections for a user, tot #gr denotes the total number of groups of sections, #layers denotes the number of layers, RFB W denotes the radio frequency bandwidth, the PSD is given per layer or per user, DB W denotes the data bandwidth, #u denotes the number of users, DB W/u denotes the data bandwidth per user (or per link)m and "ref" denotes any reference value:

| Ex: | #1 | #2 | #3 | #4 | #5 | #6 |
|---|---|---|---|---|---|---|
| Scen: | Default | Default | HTC | HTC | HPL | HPR |
| # sec | 16 | 16 | 4 | 4 | 16 | 16 |
| # gr | 1 | 1 | 1 | 1 | 1 | 4 |
| tot # gr | 1 | 1 | 4 | 4 | 1 | 4 |
| # layers | 2 | 4 | 4 | 4 | 2 | 2 |
| EIRP | ref_1 | ref_1 | ref_1 − 6 dB | ref_1 − 6 dB | ref_1 | ref_1 − 6 dB |
| RFBW | ref_2 | ref_2 | ref_2 | 4 * ref_2 | ref_2/8 | 4 * ref_2 |
| PSD | ref_3 | ref_3 − 3 dB | ref_3 − 9 dB | ref_3 − 15 dB | ref_3 + 9 dB | ref_3 − 12 dB |
| DBW | ref_4 | 2 * ref_4 | 2 * ref_4 | 8 * ref_4 | ref_4/8 | 4 * ref_4 |
| # u | ref_5 | 2 * ref_5 | 8 * ref_5 | 8 * ref_5 | ref_5 | ref_5 |
| DBW/u | ref_6 | ref_6 | ref_6/4 | ref_6 | ref_6/8 | 4 * ref_6 |

Figure 4:
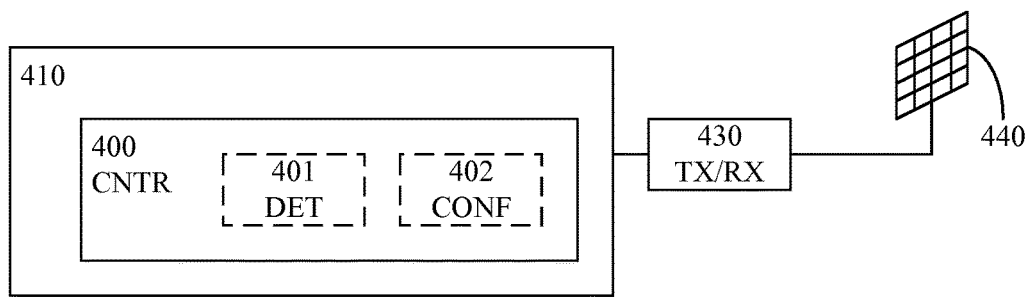
FIG. 4 is a schematic block diagram illustrating an example arrangement according to some embodiments.

FIG. 4 schematically illustrates an example arrangement 410 for controlling operations of an antenna array 440 (compare with 300 of FIG. 3) comprising two or more controllable sections and antenna ports connectable to transceiver circuitry (TX/RX) 430.

The arrangement 410 may be for, or may be comprised in, a communication apparatus (e.g. a network node or a wireless communications device). In some embodiments, the arrangement may be configured to perform, or cause performance of at least some of the method steps described in connection to any of FIGS. 1 and 2.

The arrangement 410 comprises controlling circuitry (CNTR) 400. The controlling circuitry is configured to cause determination of a scenario of transmission or reception by the antenna array (compare with step 110 of FIG. 1 and step 210 of FIG. 2) and configuration of the transceiver circuitry responsive to the determined scenario (compare with step 120 of FIG. 1 and step 220 of FIG. 2).

To this end, the controlling circuitry may comprise, or be otherwise associated with, determination circuitry (DET) 401 and/or configuration circuitry (CCNF) 402. The determination circuitry is configured to determine a scenario of transmission or reception by the antenna array (compare with step 110 of FIG. 1 and step 210 of FIG. 2). The configuration circuitry is configured to configure the transceiver circuitry responsive to the determined scenario (compare with step 120 of FIG. 1 and step 220 of FIG. 2).

As explained and exemplified earlier herein, the scenario is defined in terms of a requirement for a number of users intended as receivers or transmitters, respectively, of the transmission or reception and in terms of one or more of: a path loss requirement, a peak rate requirement, and a traffic capacity requirement.

As explained and exemplified earlier herein, the configuration comprises (for the transmission or reception) one or more of: allocation of a number of sections of the two or more sections of the antenna array and determination of a sub-division of the allocated sections, determination of a number of information data layers for MIMO application, and allocation of a bandwidth.

The controlling circuitry may also be configured to cause performance of the transmission or reception by transmission to, or reception from, the users in accordance with the configuration. To this end the controlling circuitry may be connected to, or otherwise associated with, the transceiver circuitry 430, which may be configured to perform the transmission or reception by transmission to, or reception from, the users in accordance with the configuration.

In various embodiments, the transceiver circuitry 430 and/or the antenna array 440 may also be comprised in the arrangement.

Figure 5:
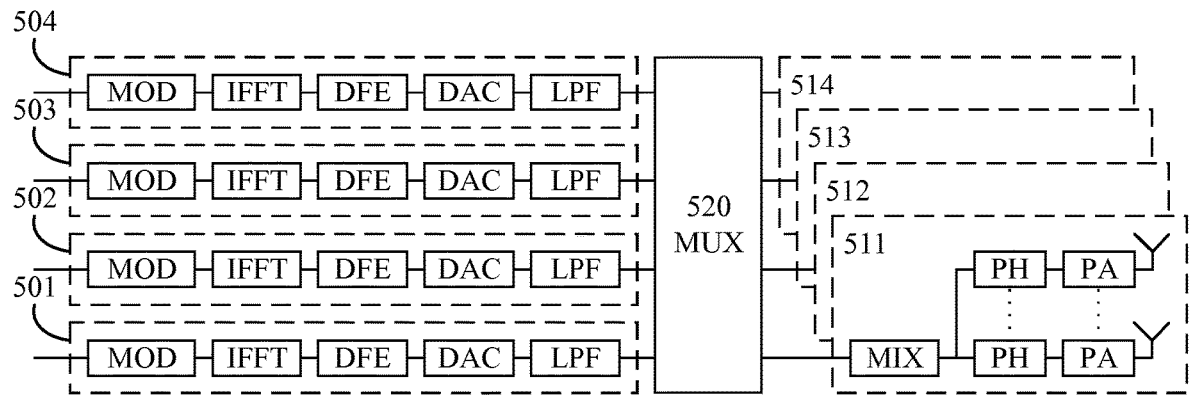
FIGS. 5-7 are a schematic block diagram illustrating example arrangements according to some embodiments.
Figure 6:
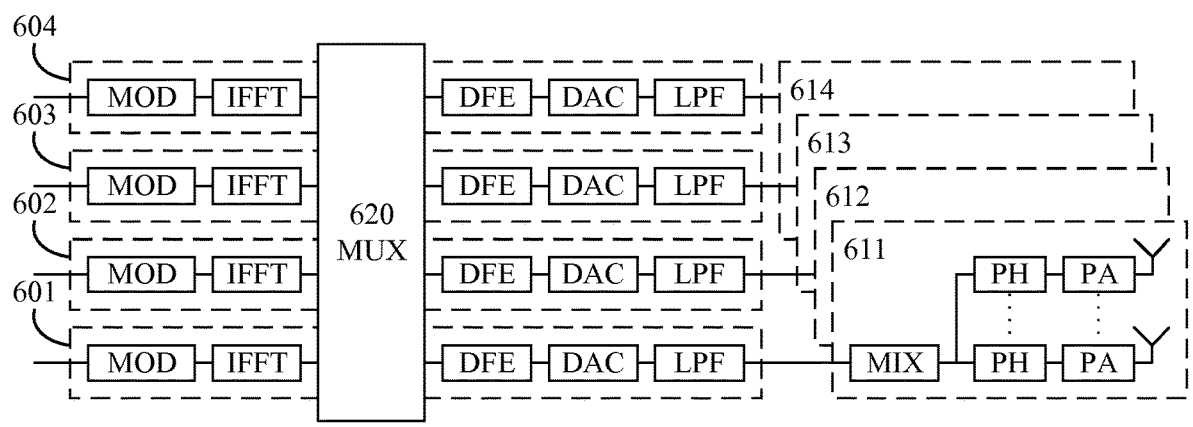
Figure 7:
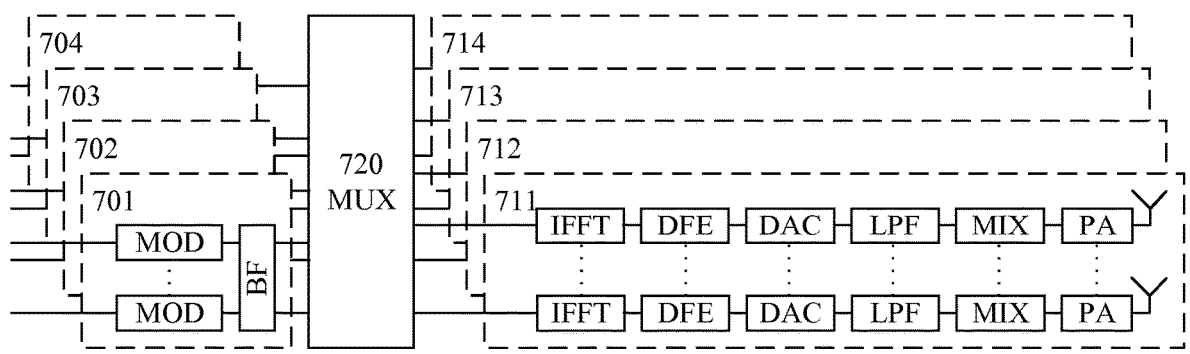

FIGS. 5-7 schematically illustrate example arrangements comprising a multiplexer (520, 620, 720) configured to distribute an incoming information stream for each user into a number of streams.

In some embodiments, any of the example arrangements of FIGS. 5-7 may be combined with the arrangement of FIG. 4. Thus, the arrangement of FIG. 4 may comprise a multiplexer (520, 620, 720), controlled by the controlling circuitry and configured to distribute an incoming information stream for each user into a number of streams corresponding to the allocated number of sections, the sub-division of the allocated sections, and the determined number of information data layers.

Only the transmitter path is shown in FIGS. 5-7. It should be understood that similar principles may apply for the receiver path.

Furthermore, the beamforming is illustrated in FIGS. 5-6 in terms of analogue beamforming (having the phase-shifting circuitry before the power amplifier); while it should be understood that similar principles may apply for hybrid beamforming and digital beamforming In the arrangement illustrated in FIG. 5, each of a plurality (here; four) processing chains 501, 502, 503, 504 is connected to a respective input of a multiplexer (MUX) 520. Each of the processing chains comprises a modulator (MOD), an inverse fast Fourier transform (IFFT), a digital front end (DFE), a digital-to-analog converter (DAC), and a low pass filter (LPF) or band pass filter (BPF).

Each of the outputs of the multiplexer 520 is connected to a respective one of a plurality of antenna-controlling hardware blocks 511, 512, 513, 514; each associated with a respective section of the antenna array. Each of the antenna-controlling hardware blocks comprises a mixer (MIX) for up-converting a signal to radio frequency (RF) and (for each antenna element of the section) phase-shifting circuitry (PH) for implementing phase-shifting to enable beamforming, and a power amplifier (PA).

By adding a multiplexer between the filter (LPF or BPF) and the up-conversion to RF, scaling between the number of simultaneous information layers (represented by the processing chains) and EIRP/EIS (maximum cell size) is enabled.

For example, by routing the signal of processing chain 504 to all of the antenna-controlling hardware blocks 511, 512, 513, 514, maximization of the EIRP/EIS is enabled. Such an approach may, for example, be suitable for some high path loss scenarios (compare with the fifth example situation above) and possibly for default scenarios with a low number of users (compare with the first and second example situations above).

As a further example, by routing the signal of each of the processing chains 501, 502, 503, 504 to a respective one of the antenna-controlling hardware blocks 511, 512, 513, 514, maximization of the number of simultaneous information layers is enabled. Such an approach may, for example, be suitable for high traffic load scenarios (compare with the third and fourth example situations above) and for high data rate scenarios (compare with the sixth example situation above).

In the arrangement illustrated in FIG. 6, each of a plurality (here; four) processing chains 601, 602, 603, 604 are split in two parts; a first part providing a respective input of a multiplexer (MUX) 620 and a second part connected to a respective output of the multiplexer 620. Each of the processing chains comprises a modulator (MOD) and an inverse fast Fourier transform (IFFT) in its first part, and comprises a digital front end (DFE), a digital-to-analog converter (DAC), and a low pass filter (LPF) or band pass filter (BPF) in its second part.

The output of each of the processing chains 601, 602, 603, 604 is connected to a respective one of a plurality of antenna-controlling hardware blocks 611, 612, 613, 614; each associated with a respective section of the antenna array. Each of the antenna-controlling hardware blocks comprises a mixer (MIX) for up-converting a signal to radio frequency (RF) and (for each antenna element of the section) phase-shifting circuitry (PH) for implementing phase-shifting to enable beamforming, and a power amplifier (PA).

The multiplexer 620 may be used similarly to what has been described in connection to FIG. 5, to enable scaling between the number of simultaneous information layers (represented by the first parts of the processing chains) and EIRP/EIS (maximum cell size).

The arrangement illustrated in FIG. 7 may be applicable for digital beamforming. In this arrangement, each of a plurality (here; four) digital processing chains 701, 702, 703, 704 (each comprising modulator(s), MCD, and digital beamforming, BF, for implementing phase-shifting) provides respective input of a multiplexer (MUX) 720. Respective outputs of the multiplexer 720 are provided to a respective one of a plurality of antenna-controlling processing chains 711, 712, 713, 714; each associated with a respective section of the antenna array.

Each of the antenna-controlling processing chains 711, 712, 713, 714 comprises inverse fast Fourier transform(s) (IFFT), digital front end(s) (DFE), digital-to-analog converter(s) (DAC), low pass filter(s) (LPF)—or band pass filter (BPF)—mixer(s) (MIX) for up-conversion to RF, and power amplifier(s) (PA).

The multiplexer 620 may be used similarly to what has been described in connection to FIG. 5, to enable scaling between the number of simultaneous information layers (represented by the number of modulators in the digital processing chains) and EIRP/EIS (maximum cell size).

It should be noted that the respective placements of the multiplexer (MUX) illustrated by FIGS. 5, 6 and 6 are merely examples. In principle, the MUX can be placed at any place in the signal path.

Thus, according to some embodiments, (dynamic) reconfiguration of an antenna array is enabled by providing a possibility for trade-off between EIRP/EIS and the number of simultaneous users, preferably while the signal path for each transmitter/receiver is limited to a bandwidth that enable efficient digital linearization. To this end, a large antenna array with several sub-sections is provided, wherein the size and number of the sub-sections is (dynamically) configurable. Typically, each section of the antenna array will have a more relaxed bandwidth requirement than the entire antenna array, thereby providing approaches to accommodate digital pre-distortion of linearization.

It should be noted that the use of embodiments is not restricted to linearized radios. Even without linearization the approaches disclosed herein may be used to extend the served bandwidth, for example.

Requirements on capacity and cell size for a mm-wave radio transceiver may strongly depend on the deployment scenario (e.g., urban, sub-urban, rural, indoor, stadium, outdoor to indoor, etc.). It would therefore be beneficial to have one hardware structure that is adaptable for different deployment scenarios (e.g., trade-off between coverage, peak-rate per user, capacity, etc.). Embodiments disclosed herein provide such hardware structures.

Furthermore, a radio channel may typically vary depending on the applicable use case and the distance (or rather path loss) to the user. Embodiments disclosed herein provide dynamic configuration to accommodate different scenarios.

As already indicated by examples above, the following three examples illustrate possible reasons to re-configure the array:

The high path loss scenario: To improve signal-to-noise ratio (SNR) at user receiver (e.g., user at cell edge), the configuration may comprise reducing the number of section groups to increase array antenna gain, reducing the number of layers and/or reducing the bandwidth (number of carriers). The network node may determine when this type of scenario is applicable, for example, based on one or more of: channel measurement reports from the users, measurement of strength of signals received from the users.

The high peak rate scenario: To increase throughput to a single user (e.g., backhaul), the configuration may comprise increasing the number of section groups and increasing the bandwidth (number of carriers). Backhaul may map to a high peak rate scenario. Typically, the channel is LOS, which means that the channel rank is two and the maximum number of data information layers is two. Thus, the peak rate cannot be increased by adding more layers. The network node easily determines when this type of scenario is applicable since it is fully aware of when backhaul is applied.

The high traffic capacity scenario: To increase cell capacity (e.g., high traffic load, many users), the configuration may comprise increasing the number of sections and increasing the number of data information layers. Typically, more layers are added first for a high traffic capacity scenario; using the full antenna array without dividing it into sections (multi-user MIMO; MU-MIMO). When all possible layers are used, sectioning of the antenna array may be applied; thereby increasing the overall bandwidth. The network node easily determines when this type of scenario is applicable since it is fully aware of the traffic load of the cell.

In some embodiments, configuration may be done dynamically (e.g., by a scheduler) to adapt the configuration and available radio resources to the traffic need. Alternatively or additionally, an initial configuration may be done at installation and remote re-configuration in terms of software settings may be performed depending on the operator need (e.g., when the spectrum assets of the operator change).

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 8:
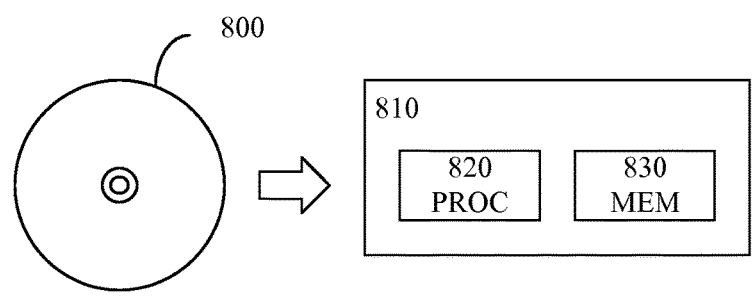
FIG. 8 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 8 illustrates an example computer readable medium in the form of a compact disc (CD) RCM 800. The computer readable medium has stored thereon a computer program comprising program instructions. The computer program is loadable into a data processor (PROC) 820, which may, for example, be comprised in a wireless communication device or a network node 810. When loaded into the data processing unit, the computer program may be stored in a memory (MEM) 830 associated with or comprised in the data-processing unit. According to some embodiments, the computer program may, when loaded into and run by the data processing unit, cause execution of method steps according to, for example, any of the methods illustrated in FIGS. 1-2 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for controlling operations of an antenna array comprising two or more controllable sections and antenna ports connected to transceiver circuitry, the method comprising:
    determining a scenario of one of transmission and reception by the antenna array, determining the scenario comprising selecting one of a plurality of predefined scenarios, the plurality of predefined scenarios comprising one or more of a high path loss scenario, a high traffic capacity scenario and a high peak rate scenario, the scenario being defined in terms of a requirement for a number of users intended as one of receivers and transmitters, respectively, of the one of the transmission and the reception and in terms of one or more of:
        a path loss requirement;
        a peak rate requirement; and
        a traffic capacity requirement; and
    configuring the transceiver circuitry responsive to the determined scenario, the configuration comprising, for the one of the transmission and the reception, one or more of:
        allocating, for each user, a number of sections of the two or more sections of the antenna array and determining a sub-division of the allocated sections;
        determining, for each user, a number of information data layers for multiple-input multiple-output, MIMO, application; and
        allocating, for each user, a bandwidth;
    configuring the transceiver circuitry responsive to the high path loss scenario comprises, for each user:
        allocating a number of sections and determining that the allocated sections are sub-divided into a single group;
        determining a number of information data layers; and
        allocating a bandwidth;
    configuring the transceiver circuitry responsive to the high traffic capacity scenario comprises, for each user:
        allocating a number of sections and determining that the allocated sections are sub-divided into a single group; and
        determining a number of information data layers; and
    configuring the transceiver circuitry responsive to the high peak rate scenario comprises, for each user:
        allocating a number of sections higher than a predetermined amount and determining that the allocated sections are sub-divided into a plurality of groups;

determining a relatively low number of information data layers lower than a predetermined amount; and allocating a bandwidth higher than a predetermined amount.

2. The method of claim 1, further comprising performing the one of the transmission and the reception by one of transmitting to, and receiving from, the users in accordance with the configuration.

3. The method of claim 1, wherein the high path loss scenario is further defined by a number of users lower than a predetermined amount.

4. The method of claim 1, wherein the high traffic capacity scenario is further defined by a number of users higher than a predetermined amount.

5. The method of claim 1, wherein the high peak rate scenario is further defined by a number of users lower than a predetermined amount.

6. The method of claim 1, wherein the number of allocated sections is higher than a predetermined amount, the number of allocated information data lower than a predetermined amount, and the allocated bandwidth is lower than predetermined amount.

7. The method according to claim 1, wherein the allocated sections are lower than a predetermined amount and the number of information data layers is higher than a predetermined amount.

8. An arrangement for controlling operations of an antenna array comprising two or more controllable sections and antenna ports connectable to transceiver circuitry, the arrangement comprising controlling circuitry configured to cause:

determination of a scenario of one of transmission and reception by the antenna array, the scenario being defined in terms of a requirement for a number of users intended as one of receivers and transmitters, respectively, of the one of the transmission and reception and in terms of one or more of:

a path loss requirement;

a peak rate requirement; and a traffic capacity requirement; and configuration of the transceiver circuitry responsive to the determined scenario, the configuration comprising, for the one of the transmission and the reception, one or more of:

allocating, for each user, a number of sections of the two or more sections of the antenna array and determining a sub-division of the allocated sections; determination, for each user, of a number of information data layers for multiple-input multiple-output, MIMO, application; and allocating, for each user, a bandwidth; and a multiplexer, controlled by the controlling circuitry and configured to distribute an incoming information stream for each user into a number of streams corresponding to the allocated number of sections, the sub-division of the allocated sections, and the determined number of information data layers.

9. The arrangement of claim 8, wherein the controlling circuitry is further configured to cause performance of the one of the transmission and the reception by one of transmission to, and reception from, the users in accordance with the configuration.

10. The arrangement of claim 8, further comprising at least one of the transceiver circuitry and the antenna array.

11. The arrangement of claim 8, wherein the arrangement is part of a wireless communication device.

12. A network node comprising an arrangement, for controlling operations of an antenna array comprising two or more controllable sections and antenna ports connectable to transceiver circuitry, the arrangement comprising controlling circuitry configured to cause:

determination of a scenario of one of transmission and reception by the antenna array, the scenario being defined in terms of a requirement for a number of users intended as one of receivers and transmitters, respectively, of the one of the transmission and reception and in terms of one or more of:

a path loss requirement;

a peak rate requirement; and a traffic capacity requirement; and configuration of the transceiver circuitry responsive to the determined scenario, the configuration comprising, for the one of the transmission and the reception, one or more of:

allocating, for each user, a number of sections of the two or more sections of the antenna array and determining a sub-division of the allocated sections;

determination, for each user, of a number of information data layers for multiple-input multiple-output, MIMO, application; and allocating, for each user, a bandwidth; and a multiplexer, controlled by the controlling circuitry and configured to distribute an incoming information stream for each user into a number of streams corresponding to the allocated number of sections, the sub-division of the allocated sections, and the determined number of information data layers.

* * * * *